United States Patent [19]
Pittman

[11] 3,753,842
[45] Aug. 21, 1973

[54] NON-WOVEN TEXTILE FABRIC
[75] Inventor: E. Henry Pittman, Spartanburg, S.C.
[73] Assignee: Deering Milliken Research Corporation, Spartanburg, S.C.
[22] Filed: Sept. 9, 1970
[21] Appl. No.: 70,664

Related U.S. Application Data
[62] Division of Ser. No. 648,597, June 26, 1967, abandoned.

[52] U.S. Cl............... 161/57, 117/161, 161/157, 260/885
[51] Int. Cl............................................. B32b 5/12
[58] Field of Search................... 161/57, 58, 59, 88, 161/89, 157; 260/885; 117/161

[56] References Cited
UNITED STATES PATENTS
2,900,980   8/1959   Harwood........................... 161/157

Primary Examiner—George F. Lesmes
Assistant Examiner—James J. Bell
Attorney—H. William Petry

[57] ABSTRACT

A non-woven textile fabric comprising a plurality of warp yarns and a plurality of fill yarns, said yarns being fibrous or filament yarns, preferably arranged in an oriented pattern and bonded together at their crossing points by an adhesive composition comprising the combination of a vinyl acetate polymer and a styrene-maleic anhydride copolymer. The adhesive composition is applied to the yarns or the fabric preferably as an aqueous emulsion, and the bond is effected by drying or subjecting the fabric to heat.

7 Claims, 3 Drawing Figures

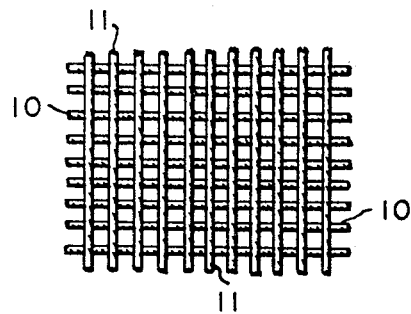
FIG.-1-
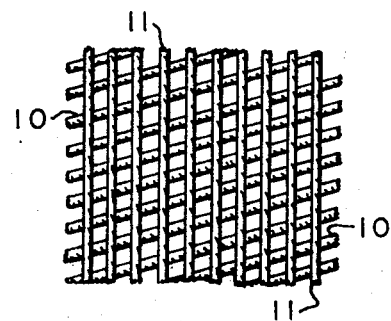
FIG.-2-
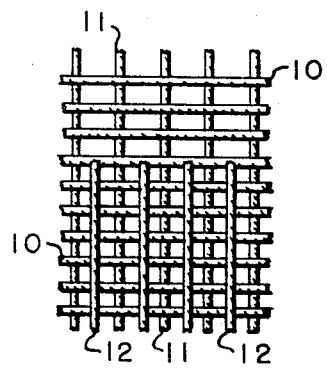
FIG.-3-

NON-WOVEN TEXTILE FABRIC

This is a division of application Ser. No. 648,597, filed June 26, 1967, now abandoned in favor of continuation application Ser. No. 70,932 filed Sept. 9, 1970.

BACKGROUND OF THE INVENTION

This invention relates to non-woven textile fabrics, and more particularly to such textile fabrics wherein the yarns are arranged in an oriented pattern and the bond between the yarns at their crossing points is effected by a novel adhesive composition comprising the combination of a vinyl acetate polymer and a styrene-maleic anhydride copolymer.

The use as binders of natural rubber latex and aqueous emulsions of synthetic rubbers, such as butadiene copolymerized with styrene for bonding fibers in non-woven fabric structures has been somewhat limited by the tendency to impart an off-white appearance to the bonded products. This tendency often is so strong that it is difficult to overcome even by the use of optical bleaches or by the use of white pigments such as titanium dioxide. Synthetic rubber adhesives are also unsatisfactory for making products that are exposed to sunlight, such as outer wearing apparel, because of the degradation which results on exposure to ultra violet radiation. When adhesives of polyvinyl acetates, chlorides, or their copolymers are used, the hand of the fabric becomes papery. The application of thermoplastic polymers such as simple esters of acrylic or methacrylic acid often results in products in which the binder has a tendency to remain thermoplastic with a resultant tendency to be affected by high temperatures.

The use of emulsions of polyvinyl acetate as adhesives in the finishing of textiles has been somewhat limited because such emulsions have a tendency to foam excessively upon agitation or shaking. For example, normal movement encountered in transporting polyvinyl acetate emulsions from one place to another is sufficient to produce foaming. This problem has been overcome to some extent by the addition of a small amount of a styrene-butadiene copolymer to the emulsion of polyvinyl acetate. (See U.S. Pat. No. 2,629,702).

The setting of thermoplastic adhesives such as polyvinyl acetate based emulsions is most often accomplished by solidification of the emulsion by evaporation of the solvent. Thus, correct choice of solvent is important as it is desirable that the solution or emulsion should have a relatively high solids content and that the solvent can be easily evaporated after the emulsion is applied to the substrate. A high solids content is desirable so that an adequate amount of the adhesive can be applied in a single application, although the solids content should not be so high as to increase the viscosity of the emulsion to the point where it is unstable or difficult to handle and spread. An ideal adhesive composition, therefore, is one wherein the desired amount of active solids can be incorporated into an emulsion or solution having a viscosity which facilitates the application and setting of the coating.

SUMMARY OF THE INVENTION

Non-woven textile fabrics are provided by this invention which comprise a plurality of warp yarns and a plurality of fill yarns, said yarns being fibrous or filament yarns arranged in an oriented pattern and bonded together at their crossing points by an adhesive composition comprising the combination of a vinyl acetate polymer and a styrene-maleic anhydride copolymer. The novel adhesive composition is applied to the yarns or the fabric preferably as an aqueous emulsion, and the bond between the yarn is formed by drying or heating the fabric.

BRIEF DESCRIPTION OF THE DRAWINGS

FIG. 1 is a view of an open mesh non-woven textile fabric of the invention comprised of one layer of parallel warp yarns and one layer of parallel fill yarns intersecting at right angles;

FIG. 2 is a view of a fabric similar to that of FIG. 1 except that the fill yarns and warp yarns do not cross at right angles.

FIG. 3 is a view of a fabric wherein a layer of fill yarns is interposed between two layers of wrap yarns.

DESCRIPTION OF THE PREFERRED EMBODIMENTS

The fabrics of this invention may be prepared by arranging the fibers and filaments in the desired pattern by any of the well-known processes. For example, French Pat. No. 1,208,968 describes a process whereby fill yarn is spirally wound around two selvedge yarns to form a web of flat loops and this web is then enclosed between two convergent warp yarn webs. The webs are then united by the application of an adhesive. An example of a fabric having this orientation is shown in FIG. 3 wherein the fill yarns 10 are arranged between two webs of warp yarns 11 and 12.

Another method for preparing fabric structures of oriented continuous strands in various patterns which can be utilized in the present invention is described in U.S. Pat. No. 3,039,169. The manner in which the yarns of the non-woven textile fabric of this invention are arranged, or the apparatuses utilized in the preparation of such arrangements will depend upon the anticipated utility and the desired aesthetic and physical properties of the end product.

The fibers and filaments from which the yarns utilized in this invention are prepared may be natural or synthetic fibers and filaments. Natural fibers such as jute, ramie, hemp and cotton may be used. Examples of synthetic fibers and filaments include rayon; cellulose esters such as cellulose acetate; vinyl resins such as polyvinyl chloride, copolymers of vinyl chloride and vinyl acetate, and polyacrylonitrile; condensation polymers such as polyamides of the nylon type and polyesters such as ethylene glycolterephthalate polymers; glass, etc. Mixtures of such yarns are also contemplated as being useful in certain applications. For example, the warp yarns may be of one material and the fill yarns of another material. Such arrangements may be desirable to improve strength or abrasion resistance of the fabrics, or to provide novel effects such as obtained by differential dyeing of the resulting fabric.

Non-woven textile fabrics comprised of viscose rayon yarns are particularly preferred. The viscose yarns may be obtained either from viscose fibers or filaments. The adhesive composition of this invention has been found to be particularly beneficial in the preparation of non-woven fabrics from pot-spun continuous viscose filaments.

The adhesive composition of the present invention may be applied to the yarns prior to formation of the fabric, or the adhesive may be applied to the fabric after the yarns have been oriented in the desired manner. The application of the adhesive can be accomplished by dipping the yarn or fabric in an emulsion or solution of the adhesive, preferably an aqueous emulsion of the adhesive, and thereafter squeezing the yarn or fabric to remove excess liquid and evenly distribute the adhesive on the yarn or fabric. Other techniques known in the art for applying liquids to fibers such as by padding or spraying can also be employed. The amount of adhesive composition incorporated into the fabric can vary over a wide range depending upon the nature of the yarn, the nature of the adhesive composition, and the end use contemplated for the fabric. For example, where a stiff fabric is desirable, increased amounts of adhesive may be applied to the fabric without detracting from its utility whereas lesser amounts of adhesive or an additional plasticizer generally may be required if the desired product is to be soft and flexible.

Emulsions and solutions of the adhesive compositions of this invention are prepared usually to provide a solids content of from about 5 to 60 percent and preferably from about 10 to 50 percent. In this manner, a pickup of the adhesive composition (solids) on the yarns or fabric of this invention of up to 30 or 40 percent by weight based on the weight of the fabric and preferably between 25 and 30 percent by weight is provided quite easily. After application of the adhesive, the yarn or fabric can be dried or heated to remove the solvent or dispersing medium to provide slight wet track, and the adhesive is thereafter set by drying or heating at higher temperatures to provide the permanent bond between the yarns at their crossing points.

As mentioned previously, the adhesive composition useful for bonding the yarns together comprises the combination of a vinyl acetate polymer and a styrene-maleic anhydride copolymer. It has been found that the incorporation of a small amount of a styrene-maleic anhydride copolymer, for example, from about 1 to about 20 percent by weight based on the weight of the vinyl acetate polymer, results in an adhesive composition having improved properties such as increased strength. The term "styrene-maleic anhydride copolymer" is intended to include copolymers of a stryene and maleic anhydride, and copolymers wherein the anhydride moiety has been converted to the acid or half-salt. The amount of styrene-maleic anhydride copolymer required in the combination of this invention will depend on the nature of the vinyl acetate polymer, for example its molecular weight, the viscosity of the combination, and the presence of other ingredients which may alter the properties of the adhesive composition. For example, the incorporation of a small amount of a plasticizer for the vinyl acetate polymer may allow for the incorporation of an increased amount of the styrene-maleic anhydride copolymer without affecting the flexibility of the adhesive.

One of the advantageous features of the composition of this invention is the ease in which the viscosity of the emulsions and solutions can be controlled. High viscosities can be obtained by the addition of small amounts of the styrene-maleic anhydride copolymer to the vinyl acetate polymer. In this manner highly viscous emulsions can be obtained without having to alter greatly the solids content. High viscosities are desirable for obtaining "wet tack". The term "wet tack" refers to the ability of the emulsion or solution to bind the filaments and yarns together while in the wet state and prior to drying. In the absence of such "wet tack", the nonwoven fabrics tend to lose the desirable orientation before the adhesive sets.

The composition of this invention can be obtained by thoroughly mixing solid vinyl acetate polymer with solid styrene-maleic anhydride copolymer. Alternatively, the polymer and copolymer may be dissolved together in a solvent, or separately in a common solvent and then combined. However, since vinyl acetate polymers are prepared commercially by polymerizing aqueous emulsions of vinyl acetate in the presence of organic peroxides, and generally are available in the form of aqueous emulsions or dispersions, the composition of this invention is preferably obtained by combining an aqueous emulsion of the vinyl acetate polymer with a water solution or emulsion of the styrene-maleic anhydride copolymer.

Emulsions of vinyl acetate polymers generally contain from about 40 to 60 percent polymer by weight. Commerically available emulsions of this type include the various "GELVA" polyvinyl acetate emulsions available from Shawinigan Resins Corp., a subsidiary of Monsanto and the "SYL-SET" emulsions available from the Sylvan Chemical Division of Magnolia Industries, Inc. These emulsions are obtained by the polymerization of vinyl acetate in water, and in many cases, other monomers are copolymerized with the vinyl acetate to obtain special properties. The number average molecular weight of the polymers and copolymers obtained by the technique vary within the ranges of from about 20,000 to about 500,000 and higher. For example, "GELVA TS–23" is an emulsion containing 55 percent solids as polyvinyl acetate having an average molecular weight of between 50,000 and 80,000, and an emulsion viscosity in the range of from 200 to 500 cps.

The properties of the vinyl acetate polymers utilized in this invention can be modified by the introduction of copolymerizable monomers with the vinyl acetate in the emulsion prior to effecting the polymerization reaction. Suitable co-monomers include acrylic acid and its lower alkyl esters, and alkyl substituted acrylic acids, such as methacrylic acid and crotonic acid and their lower alkyl esters. "Lower alkyl" esters refer to those esters containing up to about eight carbon atoms in the alkyl radical. Another example of a class of suitable co-monomers includes dicarboxylic acids such as maleic acid, its esters and anhydride.

The preparation and stability of the vinyl acetate polymer emulsions can be improved by the addition of anionic, cationic, or non-ionic emulsifiers or dispersing agents. Examples of such emulsifiers include aliphatic glycols and mono-aryl ethers of aliphatic glycols. The aliphatic glycol may be a polyalkylene glycol, and is preferably one in which the alkylene radical is a lower radical having from 1 to 10 carbon atoms. Thus, the aliphatic glycols are illustrated by ethylene glycol, trimethylene glycol, propylene glycol and hexamethylene glycol. The ethers include mono-phenyl ether of methylene glycol, mono-(hyptylphenyl) ether of triethylene glycol and the mono-(poly isobutene (molecular weight of 100) substituted phenyl) ether of octyl propylene glycol. The mono-aryl ethers are obtained by the condensation of a phenolic compound such as octyl phenol with 1 or more moles of an epoxide such as ethylene oxide, propylene oxide and 2,3-hexalene oxide. Also useful as emulsion stabilizers of the mono-alkyl ethers of aliphatic glycols in the fatty acid esters of the mono-aryl or mono-alkyl ethers are aliphatic glycols; the alkali metal and ammonium salts of sulfonic acids such as the sodium, potassium or ammonium salts of dodecyl benzene sulfonic acid and polyisobutene sulfonic acid (molecular weight of 750); and the neutral alkali metal salts of fatty acids such as lauric acid, stearic acid and oleic acid. In most instances, the emulsifier will be present in the amount of from 0.01 part to about 5 parts per 100 parts of the emulsion.

In addition to the numerous vinyl acetate polymers commercially available, the following vinyl acetate polymers have been prepared and utilized in this invention.

EXAMPLE A

A mixture of 598 parts of vinyl acetate and 15.5 parts of ethyl acrylate is prepared and 61.4 parts of the mixture is withdrawn for later use. Maleic anhydride (6.2 parts) is added to the mixture with stirring. While stirring the mixture, 332 parts of water is added followed by 49 parts of a non-ionic emulsifier obtained by reacting one mole of nonyl phenol with 40 moles of ethylene oxide. The 61.4 parts of the mixture of vinyl acetate and ethyl acetate previously withdrawn is now added to the emulsion which is heated to 35°C. Sodium meta bisulfite (1.1 parts) and sodium persulfate (1.1 parts) are added to the heated mixture which is then heated to 58°C. in an atmosphere of nitrogen. While maintaining the temperature of the mixture at about 60°C., solutions of 2.6 parts of sodium meta bisulfite in 68.7 parts of water and 2.6 parts of sodium persulfate in 68.4 parts of water are added simultaneously over a period of seven hours whereupon additional solutions of 0.76 part of sodium meta bisulfite in 17.2 parts of water and 0.76 part of sodium persulfate in 17.2 parts of water are added over a period of two hours. At this time, 0.41 part of t-butyl hydroperoxide is added, and the mixture if maintained at 60°C. for 1 hour. After cooling the mixture to about 35°C., 13.2 parts of a 25 percent solution of sodium hydroxide in water is added at the rate of 0.58 parts per minute and the mixture is cooled. The product obtained in this manner is an aqueous emulsion containing 55 percent solids having a pH of about 4.8 and a viscosity as determined on a Brookfield viscometer using a No. 1 spindle at a speed of 60 rpm of about 125 cps.

EXAMPLE B

The procedure of Example A is repeated that the non-ionic emulsifier is replaced with a commercial anionic emulsifier available under the tradename "ABEX 26 S" from Alcolac Chemical Corporation.

EXAMPLE C

The procedure of Example A is repeated except that the maleic acid is omitted from the reaction mixture.

The second component of the adhesive composition of this invention is a styrene-maleic anhydride copolymer. As mentioned earlier, this invention contemplates also the use of the acid form of the copolymer or the half-salt obtained in the hydrolysis of the anhydride in concentrated basic solutions such as sodium hydroxide solutions containing sufficient sodium ions to form the half sodium salt. Other alkali metals may be substituted for the sodium.

The production of styrene-maleic anhydride copolymers and their conversion to maleic acid copolymers and salts thereof by hydrolysis are well-known reactions employed on a commercial scale. (See, for example, U.S. Pat. Nos. 2,047,398; 2,230,240; 2,236,062; 2,430,313 and 3,297,657.) U.S. Pat. No. 2,430,313 employs a special technique for polymerization to avoid the necessity of stirring the reaction mixture during the terminal portion of the reaction. Such a process is desirable because an extremely high viscosity is obtained during the polymerization due to the swelling of the polymer by the reaction solvent to produce a viscous material which requires stirrers of an extremely high power to move through the mixture.

Hydrolysis of a styrene-maleic anhydride copolymer by conventional procedures employs substantial volumes of water or, as provided in U.S. Pat. No. 3,297,657, the hydrolysis may be conducted in the presence of a solvent for the polymerization reaction, and when hydrolysis is complete, the solvent and water can be removed concurrently thus avoiding viscous aqueous solutions of the hydrolyzed polymer.

The styrene-maleic anhydride copolymers of the second component in the combination of this invention generally contain styrene or substituted styrenes such as p-chlorostyrene, 2-methyl styrene, etc., copolymerized with maleic anhydride in the molar ratio of from 0.5:1 to 3:1. These materials are commercially available from The Sylvan Chemical Division of Magnolia Industries, Inc., under the tradename "SYLVAN DMAS", and from Texas Butadiene and Chemical Corp., under the tradenames "SMA 1000 A", "SMA 2000 A", and "SMA 3000 A". These copolymers have molecular weights between about 1,000 and 3,000, and the anhydride form of the copolymers have melting points varying between about 140°C. to 200°C.

The adhesive composition of this invention is obtained generally by adding the styrene-maleic anhydride copolymer to an aqueous emulsion containing the vinyl acetate polymer. The blending of the two components can be facilitated by first preparing a solution or emulsion of the styrene-maleic anhydride copolymer and thereafter adding the solution or emulsion to the polyvinyl acetate emulsion while stirring. In some instances, slight heating of the solutions will facilitate the blending operation.

As mentioned previously, it may be desirable to incorporate into the adhesive composition of this invention other ingredients in order to alter or improve the plastic and penetrating properties of the composition. For example, the incorporation of plasticizers such as glycerine, ethylene glycol, diethylene glycol, sorbitol, urea, and ethoxylated glycols such as obtained by the reaction of ethylene glycol with an excess of ethylene oxide have been found useful to impart flexibility to the composition although the amount added should not be sufficient to reduce substantially the adhesive properties of the composition. The amount of plasticizer incorporated into the adhesive composition of this invention can be varied, depending upon the nature of the yarn or fabric being treated, from about 0.1 percent to about 20 percent and preferably from about 1 to 10 percent by weight of the dry adhesive composition. The presence of the styrene-maleic anhydride copolymer in the adhesive composition reduces the need for additional plasticizer because of the plasticizing properties of the copolymer itself.

The following examples illustrate the adhesive compositions of this invention. Unless otherwise indicated all parts are by weight.

EXAMPLE 1

| | Parts |
|---|---|
| The vinyl acetate polymer emulsion of Example A | 144.4 |
| A styrene-maleic anhydride copolymer obtained by reacting one mole of maleic-anhydride with one mole of styrene | 30.0 |
| Plasticizer obtained by reacting one mole of ethylene glycol with twelve moles of ethylene oxide in the presence of sodium hydroxide | 9.0 |
| Water | 16.6 |

EXAMPLE 2

| | Parts |
|---|---|
| The vinyl acetate polymer emulsion prepared in Example A | 100 |
| The half sodium salt of the styrene-maleic anhydride copolymer obtained by reacting one mole of styrene with one mole of maleic anhydride (20% % solution in water) | 10 |

EXAMPLE 3

| | Parts |
|---|---|
| The vinyl acetate polymer emulsion preapred in Example A | 100 |
| The half sodium salt of styrene-maleic anhydride copolymer obtained by reacting one mole of styrene with one mole of maleic anhydride (20% solution in water) | 10 |
| Plasticizer of Example 1 | 5 |

EXAMPLE 4

| | Parts |
|---|---|
| "GELVA TS-23" | 90 |
| "SMA 1000 A" | 10 |
| Diethylene glycol | 2 |

EXAMPLE 5

EXAMPLE 5

| | Parts |
|---|---|
| The vinyl acetate polymer emulsion of Example B | 171.4 |
| Styrene-maleic anhydride copolymer (1.5:1 molar ratio) | 10.0 |
| Urea | 9.0 |
| Water | 9.6 |

EXAMPLE 6

| | Parts |
|---|---|
| Polyvinyl acetate emulsion of Example A | 59.8 |
| Styrene-maleic anhydride copolymer (1:1 molar ratio) hydrolyzed to the dicarboxylic acid | 10 |
| Water | 20 |

EXAMPLE 7

| | Parts |
|---|---|
| Polyvinyl acetate of Example A | 150 |
| Styrene-maliec anhydride copolymer (1:1 molar ratio) converted to the half potassium salt (10 solution in water) | 40 |
| Glycerine | 5 |
| Water | 5 |

The adhesive compositions of this invention have been found useful in the usual applications wherein an adhesive is desired. For example, sheets of paper stock may be tightly bonded to each other by applying a thin film of the composition of the invention to a sheet of paper, superimposing a second sheet of paper in contact with said film and thereafter applying pressure to complete the bond. Moreover, the adhesive is useful in bonding dissimilar materials such as paper to wood, paper to textile fabrics such as woolen, cotton and synthetic fabrics, paper to metal foils, and nitrocellulose to rayon for book covers. An extremely strong bond is obtained in these instances.

The adhesive compositions of this invention have been found to be useful particularly in the preparation of non-woven textile fabrics, especially fabrics comprised of yarns composed of synthetic materials such as polyesters, polyethers and regenerated cellulose. The non-woven fabrics can be obtained by heat treating a non-woven fabric wherein the yarns have been coated with the adhesive composition of the invention. Coating of the yarns can be accomplished either by passing the yarns through an emulsion of the adhesive prior to formation of the fabric structure, or the fabric structure can be prepared and thereafter conveyed through an emulsion of the adhesive.

The structure and orientation of the yarns and fibers of the non-woven textile fabrics of this invention may be obtained by any of the processes known in the art. Although the adhesive compositions of this invention are useful for bonding non-woven fiber and filament products having a well defined oriented structure or fibrous mats in which the fibers or filaments are distributed haphazardly or in a random array, the adhesive is particularly useful for bonding textile fabric structures wherein the yarns are arranged in an oriented pattern and bonded together at their crossing points. For example, as shown in FIG. 1, a layer of parallel fill yarns 10 is contacted with a layer of parallel warp yarns 11, the warp and fill yarns intersecting at right angles. In FIG. 2, the warp and fill yarns of a fabric may be arranged so that the fill yarns 10 are substantially parallel to each other and the warp yarns 11 are substantially parallel to each other although the warp yarns and fill yarns do not intersect at right angles. The fabric may be prepared by the methods disclosed in U.S. Pat. No. 3,039,169 and French Pat. No. 1,208,968 from continuous multi-filament strands. The apparatuses and methods described therein are particularly useful for preparing open-mesh non-woven textile fabrics commonly referred to a "Scrim" fabrics and decorative fabrics where the pattern of the strands may provide the decoration, or where some of the strands may be of a different material or of different colors.

The following Examples illustrate the non-woven textile fabrics and the methods of preparing these fabrics in accordance with the present invention. Unless otherwise indicated all parts and percentages are by weight.

EXAMPLE 8

An all viscose (5 denier, 1.25 inch staple) carded web weighing about two ounces per square yard is sprayed with the adhesive emulsion of Example 1 to a wet pickup of about 50 percent, dried for two minutes at 110°C., and thereafter heated for two minutes at 150°C. The resulting non-woven fabric contains about 25 percent adhesive and is highly porous.

EXAMPLE 9

The procedure of Example 8 is repeated except that the fabric is sprayed with the aqueous emulsion of Example 2.

EXAMPLE 10

A non-woven structure comprising one layer of 1,100 denier pot-spun filament viscose fill yarn arranged substantially parallel to each other is disposed between two convergent warp yarn webs wherein the warp yarn is 1,100 denier pot-spun filament viscose. The intersecting warp and fill yarns form a scrim pattern as shown in FIG. 3 wherein the distance between the parallel yarns is about 0.5 cm. The webs are bonded to each other by conveying the structure through the aqueous emulsion of Example 3 which has a viscosity of 465,000 cps. as determined on a Brookfield viscometer using a No. 2 spindle at 60 r.p.m., and then subjecting the treated structure to a temperature of about 150°C. to remove volatile liquids. In this manner, the adhesive comprises about 30 percent of the textile fabric which has a soft hand and is characterized by an open weave wherein the spaces between the yarns are substantially free of adhesive.

EXAMPLE 11

The procedure of Example 10 is repeated except that the aqueous emulsion of Example 2 is utilized.

EXAMPLE 12

The procedure of Example 10 is repeated except that the fill yarn layer is prepared from 900 denier high tenacity monofilament viscose yarn. The product obtained in this manner exhibits a strong bond between the yarns with little or no distortion from the desired orientation.

That which is claimed is:

1. A non-woven textile fabric comprising a plurality of warp yarns and a plurality of fill yarns, said yarns being fibrous or filament yarns arranged in an oriented pattern and bonded together at their crossing points by an adhesive composition comprising the combination of a vinyl acetate polymer and a styrene-maleic anhydride copolymer.

2. The textile fabric of claim 1 wherein the yarns are comprised of regenerated cellulose fibers or filaments.

3. The textile fabric of claim 1 wherein the yarns are comprised of regenerated cellulose filaments.

4. The textile fabric of claim 1 wherein the styrene-maleic anhydride copolymer is present in the adhesive composition in the amount within the range of from about 1 to about 20 percent by weight.

5. The textile fabric of claim 1 wherein from about 1 to 10% of a plasticizer is incorporated into the adhesive composition.

6. The textile fabric of claim 1 wherein the vinyl acetate polymer in the adhesive composition is a copolymer obtained by the polymerization of a mixture comprising vinyl acetate, from about 0 to 3 percent of maleic anhydride, and from about 0 to 5 percent of acrylic acid, alkyl substituted acrylic acids or the alkyl esters thereof.

7. The textile fabric of claim 1 wherein the fabric is comprised of at least one layer of substantially parallel warp yarns and at least one layer of substantially parallel fill yarns.

* * * * *

PO-1050
(5/69)

UNITED STATES PATENT OFFICE
CERTIFICATE OF CORRECTION

Patent No. 3,753,842      Dated August 21, 1973

Inventor(s) E. Henry Pittman

It is certified that error appears in the above-identified patent and that said Letters Patent are hereby corrected as shown below:

In the specification, column 2, line 17, "wrap" should read --warp--.

In the examples, Example B, column 5, line 51, after the word "repeated", insert --except--.

In the examples, Example 1, column 7, last line of Example 1, delete last word "water".

In the examples, Example 5, delete one title "Example 5".

In the specification, column 8, line 40, "a" should read --as--.

In the examples, Example 2, column 7, last line of Example 2, delete the second "%".

Signed and sealed this 19th day of February 1974.

(SEAL)
Attest:

EDWARD M. FLETCHER, JR.      C. MARSHALL DANN
Attesting Officer      Commissioner of Patents